(12) United States Patent
Kesarwani et al.

(10) Patent No.: US 11,243,832 B2
(45) Date of Patent: Feb. 8, 2022

(54) DYNAMICALLY ANALYZING DIAGNOSTIC OPERATIONS DATA VIA MACHINE LEARNING TECHNIQUES

(71) Applicant: International Business Machines Corporation, Armonk, NY (US)

(72) Inventors: Manish Kesarwani, Bangalore (IN); Akshar Kaul, Bangalore (IN); Hong Min, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 16/598,464

(22) Filed: Oct. 10, 2019

(65) Prior Publication Data

US 2021/0109802 A1 Apr. 15, 2021

(51) Int. Cl.
  *G06F 11/00* (2006.01)
  *G06F 11/07* (2006.01)
  *G06K 9/62* (2006.01)
  *G06N 20/00* (2019.01)

(52) U.S. Cl.
  CPC ........ *G06F 11/079* (2013.01); *G06F 11/0778* (2013.01); *G06K 9/6267* (2013.01); *G06N 20/00* (2019.01)

(58) Field of Classification Search
  CPC ............. G06F 11/0778; G06F 11/0771; G06F 11/079; G06N 20/00; G06K 9/6267
  See application file for complete search history.

(56) References Cited

U.S. PATENT DOCUMENTS

| 6,553,365 | B1 * | 4/2003 | Summerlin ........... G06F 16/285 707/740 |
| 6,823,203 | B2 | 11/2004 | Jordan |
| 7,152,244 | B2 | 12/2006 | Toomey |
| 8,122,517 | B2 | 2/2012 | Julin et al. |
| 8,166,313 | B2 | 4/2012 | Fedtke |
| 8,296,301 | B2 * | 10/2012 | Lunde ................. G06F 11/1461 707/738 |

(Continued)

FOREIGN PATENT DOCUMENTS

KR 20110069710 A 6/2011

*Primary Examiner* — Jonathan D Gibson
(74) *Attorney, Agent, or Firm* — Ryan, Mason & Lewis, LLP

(57) ABSTRACT

Methods, systems, and computer program products for dynamically analyzing diagnostic operations data via machine learning techniques are provided herein. A computer-implemented method includes defining aspects of machine learning techniques to be performed in connection with diagnostic operation data analysis, including: defining dynamic analysis granularity selection functionality based on time constraints and the level of progress of the analysis; defining dynamic data classification identifier type selection functionality based on the time constraints and the level of progress of the analysis; and defining dynamic ordering of data classification identifiers during runtime based on data classification preferences, information pertaining to system workload, and information pertaining to requested analysis compliance parameters. The method also includes dynamically performing the analysis by applying the machine learning techniques to the diagnostic operation data, and outputting at least a portion of results of the analysis.

20 Claims, 5 Drawing Sheets

(56) References Cited

U.S. PATENT DOCUMENTS

| | | | |
|---|---|---|---|
| 8,346,532 B2 | 1/2013 | Chakra et al. | |
| 8,639,896 B2 | 1/2014 | Bank et al. | |
| 8,688,700 B2 | 4/2014 | Fallen et al. | |
| 8,930,327 B2 | 1/2015 | Hossain et al. | |
| 9,552,272 B1* | 1/2017 | Liang | G06F 11/0778 |
| 2006/0005017 A1 | 1/2006 | Black et al. | |
| 2006/0075228 A1 | 4/2006 | Black et al. | |
| 2009/0192979 A1* | 7/2009 | Lunde | G06F 16/285 |
| 2015/0113240 A1 | 4/2015 | Abrams et al. | |
| 2015/0149830 A1* | 5/2015 | Escobar Olmos | G06F 11/0706 |
| | | | 714/38.11 |
| 2015/0248564 A1* | 9/2015 | Feng | G06F 8/54 |
| | | | 726/26 |
| 2016/0342903 A1* | 11/2016 | Shumpert | G06F 11/079 |
| 2017/0017537 A1* | 1/2017 | Razin | G06N 20/00 |
| 2017/0235624 A1 | 8/2017 | Farinacci et al. | |
| 2019/0065780 A1* | 2/2019 | Joisha | G06F 11/0778 |
| 2019/0213355 A1* | 7/2019 | Raviv | G06F 8/41 |
| 2019/0294484 A1* | 9/2019 | Luo | G06F 11/0739 |
| 2021/0026722 A1* | 1/2021 | Bhatia | G06N 3/088 |

\* cited by examiner

DYNAMICALLY ANALYZING DIAGNOSTIC OPERATIONS DATA VIA MACHINE LEARNING TECHNIQUES

FIELD

The present application generally relates to information technology and, more particularly, to data management techniques.

BACKGROUND

Diagnostic operations, such as diagnostic dumps, are often carried out when a system faces one or more errors or failures. Additionally, diagnostic dump files generally contain an entire memory snapshot at the time of failure, commonly being quite large in size. Also, diagnostic dumps often contain sensitive data, and are frequently required to be shared with third-party vendors for diagnostics, which poses a security risk related to exposure of sensitive data. Detecting and removing such sensitive data in diagnostic dump files, however, is conventionally a time- and labor-intensive process, creating system-related bottlenecks and inefficiencies.

SUMMARY

In one embodiment of the present invention, techniques for dynamically analyzing diagnostic operations data via machine learning techniques are provided. An exemplary computer-implemented method includes processing user inputs pertaining to diagnostic operation data analysis associated with a system, wherein the user inputs comprise one or more time constraints and one or more data classification preferences, and defining, based at least in part on the processed user inputs, one or more aspects of machine learning techniques to be performed in connection with the diagnostic operation data analysis. In such a method, defining the one or more aspects of the machine learning techniques comprises defining dynamic analysis granularity selection functionality based at least in part on the one or more time constraints and the level of progress of the diagnostic operation data analysis, defining dynamic data classification identifier type selection functionality based at least in part on the one or more time constraints and the level of progress of the diagnostic operation data analysis; and defining dynamic ordering of data classification identifiers during runtime based at least in part on the one or more data classification preferences, information pertaining to system workload, and information pertaining to one or more requested analysis compliance parameters. Further, such a method also includes dynamically performing the diagnostic operation data analysis by applying the machine learning techniques to the diagnostic operation data, and outputting at least a portion of results of the diagnostic operation data analysis to at least one user.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
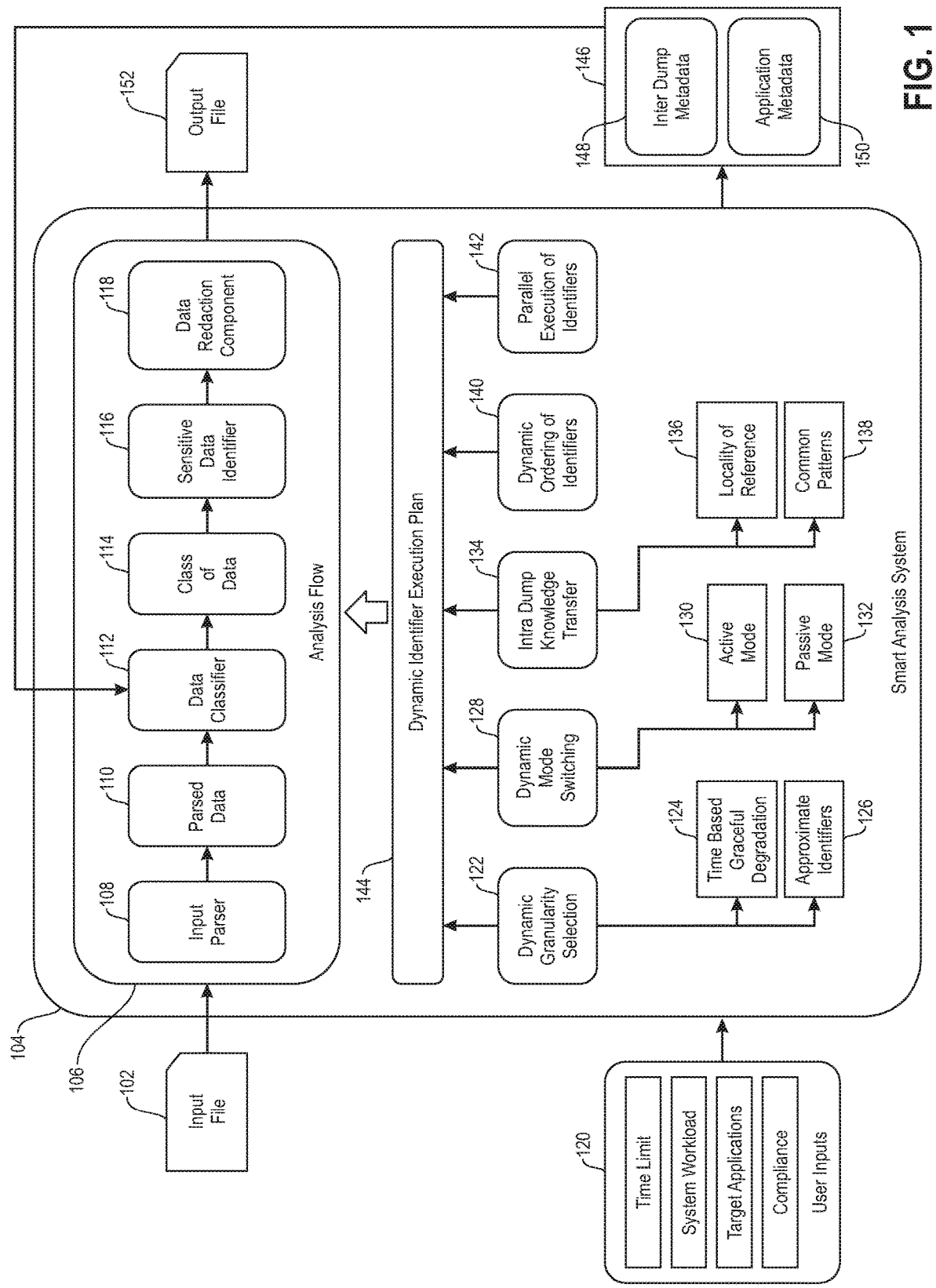
FIG. 1 is a diagram illustrating system architecture, according to an exemplary embodiment of the invention.

As described herein, an embodiment of the present invention includes improving the reaction time for analysis of diagnostics system dumps and efficiently analyzing diagnostics system dumps to self-tune the extent of sensitivity analysis performed to maximize accuracy based on one or more user constraints. At least one embodiment includes utilizing user inputs to define machine language analytics for performing dynamic granularity-selection analysis of diagnostic system dumps for improving analysis reactions and/or performance time.

Such an embodiment includes performing time-based graceful degradation and possible upgradation at different intervals of time based on user time constraints and progress of analysis. For example, with respect to implementing a fine-grained analysis (such as, for instance, a "verbose" analysis), at least one embodiment includes processing every token in a page and determining whether to redact one or more portions. With respect to implementing a coarse-grained analysis (such as, for example, a page-level analysis), at least one embodiment includes merely determining the first sensitive token in a page and redacting the entire page before moving on to the next page.

By way of further example, assume that the initial selected granularity of analysis is set to "verbose." At least one embodiment can include dynamically changing the selected granularity of analysis to "concise" or "Boolean" granularity if the estimated time needed to process the remaining dump (in "verbose") is more than the user-provided limit.

Additionally, one or more embodiments include automatically switching among levels of identifiers used (for example, from more precise identifiers to more relaxed approximate identifiers) at different intervals of time based on user time constraints and progress of the analysis. For example, the system can initially start processing with a "precise" identifier set, but then switch to "approximate" identifiers if the time needed to process the remaining dump is more than the user provided limit. Further, such an embodiment can include performing dynamic analysis mode (passive mode versus active mode, for example) switching to facilitate quick(er) identification of quasi-identifiers, as well as utilizing intra-dump knowledge to effectively record the locality of reference information about the location of actual data within dump files, and to effectively record the locality of hot identifiers (that is, identifiers that are likely to appear in an application context) set by intra-dump knowledge.

Also, at least one embodiment includes dynamically ordering identifiers based on user preferences, system workloads and a level of compliance requested to persist inter-dump processing information and application metadata to optimize future analysis of dump files. In one or more embodiments, process performance is related to the size of the identifier set. For example, if it is known that for a given application, certain types of identifiers would not appear, at least one embodiment includes tailoring the identifier set to improve search time. Additionally, one or more embodiments include searching a new diagnostic dump based on knowledge learned from a previous diagnostic dump. For instance, certain pages can be skipped if a previous determination was made that such pages do not contain sensitive data.

FIG. 1 is a diagram illustrating system architecture, according to an embodiment of the invention. By way of illustration, FIG. 1 depicts an input file 102, which can include diagnostic dumps, logs, etc. The input file 102 is provided to and/or obtained by an input parser 108 (which is part of analysis flow 106, which is carried out by smart analysis system 104), which parses the input file 102 to recognize portions of parsed data 110 derived from input file 102.

As illustrated, analysis flow 106 also includes a data classifier 112, which classifies different parts of the parsed data 110 into various classes 114 using one or more techniques and/or models. FIG. 1 also depicts a sensitive data identifier 116, which determines whether the class assignment 114 contains sensitive data. In one or more embodiments, the sensitive data identifier 116 uses a class-to-sensitivity mapping to analyze the classified data 114. Also, in at least one embodiment, the sensitive data identifier 116 implements direct identifiers and quasi-identifiers. As used herein, quasi-identifiers indicate situations wherein multiple classes should be present together, and in such embodiments, the nearness of data should be taken into consideration. The output of sensitive data identifier 116 can include data (from the classified data 114) tagged as sensitive or non-sensitive.

Additionally, analysis flow 106 further includes a data redaction component 118, which redacts the identified sensitive data from the input file 102 and generates an output file 152. In one or more embodiments, various user-configurable methods can be implemented by the data redaction component 118, including, e.g., hashing, replacement, and encryption.

As also illustrated, FIG. 1 additionally depicts a dynamic identifier execution plan 144, which is provided to and/or incorporated into the analysis flow 106. The dynamic identifier execution plan 144 is determined and/or generated via the implementation of components 122, 128, 134, 140 and 142, as detailed below.

User inputs 120 are provided to the smart analysis system to be used in connection with generating the dynamic identifier execution plan 144. For example, in one or more embodiments, diagnostic dump analysis and removal of sensitive data are important pre-processing steps, and problem identification can only start after such pre-processing has occurred. In such an embodiment, one or more users can provide inputs 120 to specify various constraints in order to facilitate the analysis. Such inputs can include, for example, time limit information, wherein the user can specify the maximum permitted time to analyze the dump file. Other inputs 120 can include system workload information, wherein the user can provide a list of applications which were running at the time of a system failure, which can help to identify the size of application headers and the position of data in different memory pages. Also, inputs 120 can include target application information, which can help to efficiently organize the selected identifiers, as well as compliance information, wherein the user can provide a list of compliance parameters that the processed dump should satisfy before reaching a third party.

As also depicted in FIG. 1, the smart analysis system 104 includes a dynamic granularity selection component 122, which generates time-based graceful degradation information 124 as well as approximate identifiers 126. With respect to time-based graceful degradation 124, given a time limit for execution, one or more embodiments can include intelligently increasing or decreasing the granularity of machine learning testing. By way merely of example, the following granularity of processing can be supported by the system in an example embodiment: Verbose processing, wherein sensitive data identification is carried out across page boundaries; Concise processing, wherein all of the sensitive tokens are identified in each page individually; and Boolean processing, wherein the identification for a page is exited after detecting a first sensitive token.

Also, by way of example, consider a scenario wherein the diagnostic dump processing has to finish in a given time limit (say, five hours). In such an example embodiment, initially, a normal level of processing can be carried out, consumed time can be periodically measured, the time needed to complete the analysis can be periodically estimated, and if the time needed to complete is greater than the remaining portion of the overall time limit, a switch to a faster level of processing can be made. If the time needed to complete is less than the remaining portion of the overall time limit, a switch to slower more detailed processing can be made.

With respect to approximate identifiers 126, one or more embodiments can include transitioning from multiple dictionaries to a single dictionary (which reduces the accuracy but facilitates faster execution). For example, with an approximate identifier, both "first name" and "last name" identifiers can be merged to form a single (same) identifier.

As also depicted in FIG. 1, the smart analysis system 104 includes a dynamic mode switching component 128, which generates and/or enables an active analysis mode 130 and a passive analysis mode 132. With respect to an active mode 130, each token can be tested against all identifiers. Also, in one or more embodiments, an active mode can be designated as the default mode of execution. With respect to a passive mode 132, each identifier can be executed for all tokens one by one. In an example embodiment, a first identifier is selected and run for all tokens, and then a second identifier is fetched, etc. Additionally, in one or more embodiments, with respect to quasi-identifiers, the second identifier (of a quasi-identifier) is run only if the first identifier is found somewhere in the record.

Additionally, the smart analysis system 104 includes an intra-dump knowledge transfer component 134, which determines locality of reference information 136, which can help to prioritize identifiers. For example, the identifiers which have a positive match in a current page will have more priority in the subsequent pages. Also, the intra-dump knowledge transfer component 134 determines patterns 138 of entity types. By way of example, if a record has <first name>, <last name>, <ssn>, and <dob> for multiple identifiers, then the system can group these identifiers and prioritize their execution. Once a pattern is identified, the same identifiers can be run in the same order.

One or more embodiments include identifier management tools including a dynamic identifier ordering component 140 and a parallel identifier execution component 142. With respect to the dynamic identifier ordering component 140, various different types of identifiers (derived from dictionaries, regular expressions, and machine learning techniques) can be run in series until a match is found. At least one embodiment includes keeping track of identifiers which match, and running those identifiers before the identifiers that are not matching (while the statistics can be maintained for a given temporal window). Also, identifiers can be ordered based on application metadata and compliance parameters requested. With respect to the parallel identifier execution component 142, disjoint identifiers for different compliance can be executed in parallel.

As depicted in FIG. 1, the outputs from components 122, 128, 134, 140 and 142 are provided to and/or incorporated into the dynamic identifier execution plan 144. For example, one or more embodiments include ordering the identifiers to be searched to improve performance. Such a type of action is similar, for example, to a database query execution plan, which might include knowing and/or estimating the likely cost of each search step and globally optimizing the entire search.

FIG. 1 also depicts a component directed to persisting metadata 146, which includes an inter-dump metadata component 148 and an application metadata component 150. With respect to the inter-dump metadata component 148, from multiple diagnostic dumps belonging to the same application, at least one embodiment can include finding the part of dump most likely to contain sensitive data. In the future runs, such an embodiment includes first analyzing the part of the diagnostic dump which is most likely to contain the sensitive data. With respect to the application metadata component 150, patterns identified with respect to a specific application can be utilized in future runs to improve performance, and application-specific tag information can be identified to help in fetching data quickly from diagnostic dump pages. Outputs from component 146 are provided to the data classifier 112.

Further, one or more embodiments include extending one or more of the techniques and/or components detailed herein to distributed systems. Such an embodiment can include processing input files (e.g., diagnostic dump files) generated in a distributed system, and the analysis can be handled via combining partial dumps and/or processing individual dumps.

Figure 2:
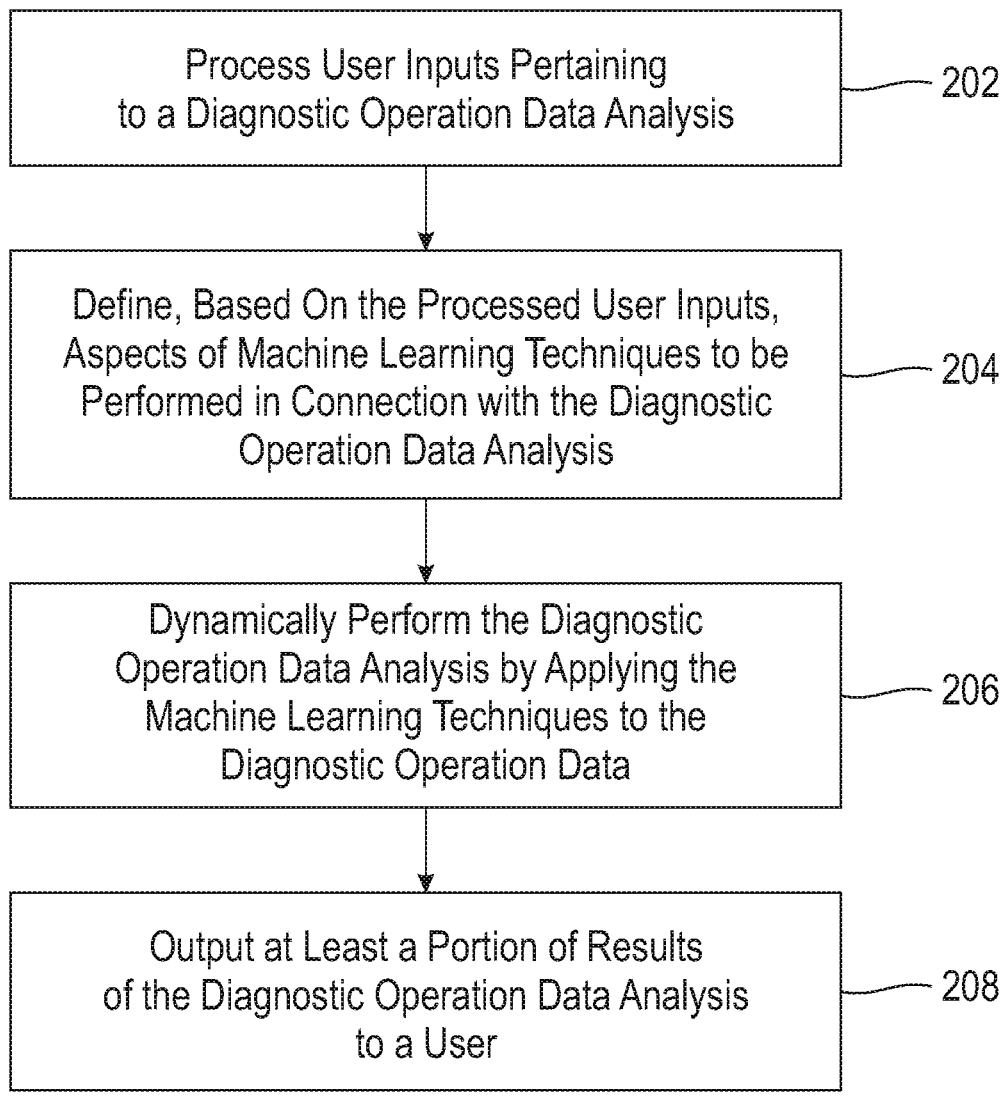
FIG. 2 is a flow diagram illustrating techniques according to an embodiment of the invention.

FIG. 2 is a flow diagram illustrating techniques according to an embodiment of the present invention. Step 202 includes processing user inputs pertaining to diagnostic operation data analysis associated with a system, wherein the user inputs comprise (i) one or more time constraints and (ii) one or more data classification preferences.

Step 204 includes defining, based at least in part on the processed user inputs, one or more aspects of machine learning techniques to be performed in connection with the diagnostic operation data analysis. In at least one embodiment, defining the one or more aspects of the machine learning techniques includes defining dynamic analysis granularity selection functionality based at least in part on the one or more time constraints and the level of progress of the diagnostic operation data analysis, defining dynamic data classification identifier type selection functionality based at least in part on the one or more time constraints and the level of progress of the diagnostic operation data analysis, and defining dynamic ordering of data classification identifiers during runtime based at least in part on the one or more data classification preferences, information pertaining to system workload, and information pertaining to one or more requested analysis compliance parameters.

Further, analysis granularity selection functionality can include selecting between (i) verbose analysis granularity, (ii) concise analysis granularity, and (iii) Boolean analysis granularity. Also, dynamic data classification identifier type selection functionality can include selecting between (i) one or more precise data classification identifiers and (ii) one or more approximate data classification identifiers.

Step 206 includes dynamically performing the diagnostic operation data analysis by applying the machine learning techniques to the diagnostic operation data. Applying the class-to-sensitivity mapping technique can include implementing (i) one or more direct sensitivity identifiers and (ii) one or more quasi sensitivity identifiers. In one or more embodiments, quasi sensitivity identifiers (i) require two or more particular classes being present together and (ii) consider nearness of data. Additionally, in at least one embodiment, defining aspects of the machine learning techniques includes defining dynamic analysis mode switching functionality based at least in part on a lack of identification of one or more particular data classification identifiers in the diagnostic operation data analysis. In such an embodiment, analysis mode switching functionality includes selecting between (i) an active mode of analysis and (ii) a passive mode of analysis, wherein the active mode of analysis facilitates identification of one or more quasi-identifiers in the diagnostic operation data analysis.

Step 208 includes outputting at least a portion of results of the diagnostic operation data analysis to at least one user.

The techniques depicted in FIG. 2 can also include persisting diagnostic operation data processing information and related application metadata, and optimizing one or more subsequent diagnostic operation data analyses based at least in part on the diagnostic operation data processing information and the related application metadata. Further, at least one embodiment includes utilizing intra-diagnostic operation data knowledge to record the locality of reference information pertaining to one or more locations of particular data within the diagnostic operation data, as well as utilizing intra-diagnostic operation data knowledge to record locality of one or more identifiers.

Also, in one or more embodiments, the system includes a distributed system. Such an embodiment can include self-tuning a level of sensitivity for the diagnostic operation data generated in the distributed system.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
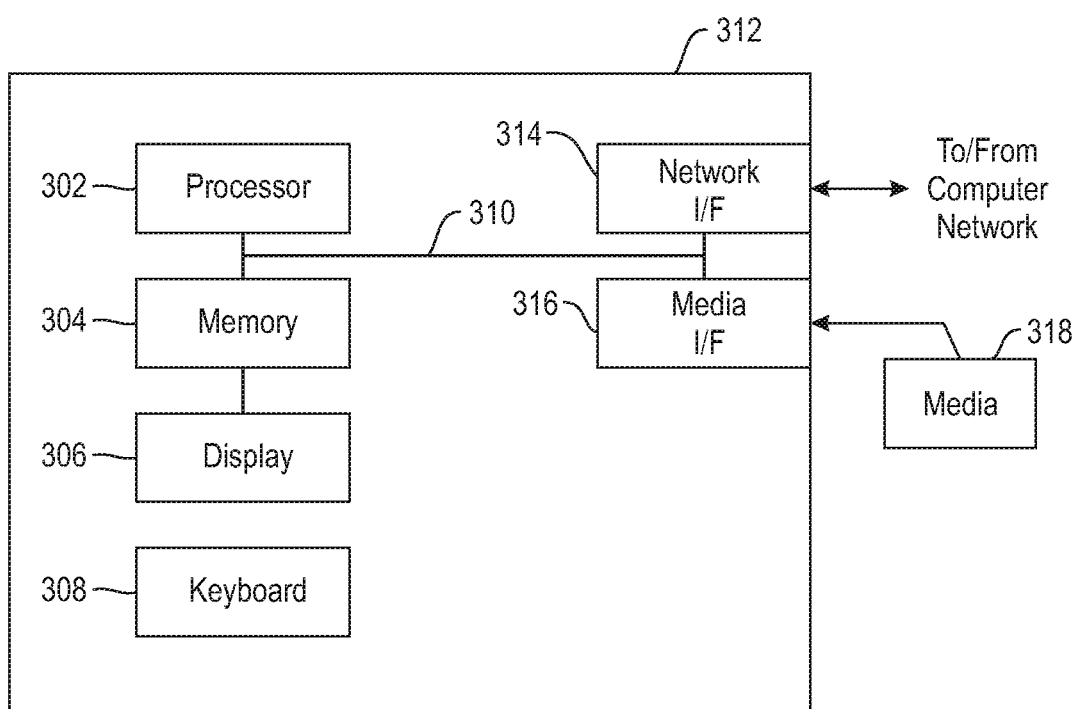
FIG. 3 is a system diagram of an exemplary computer system on which at least one embodiment of the invention can be implemented.

Additionally, an embodiment of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
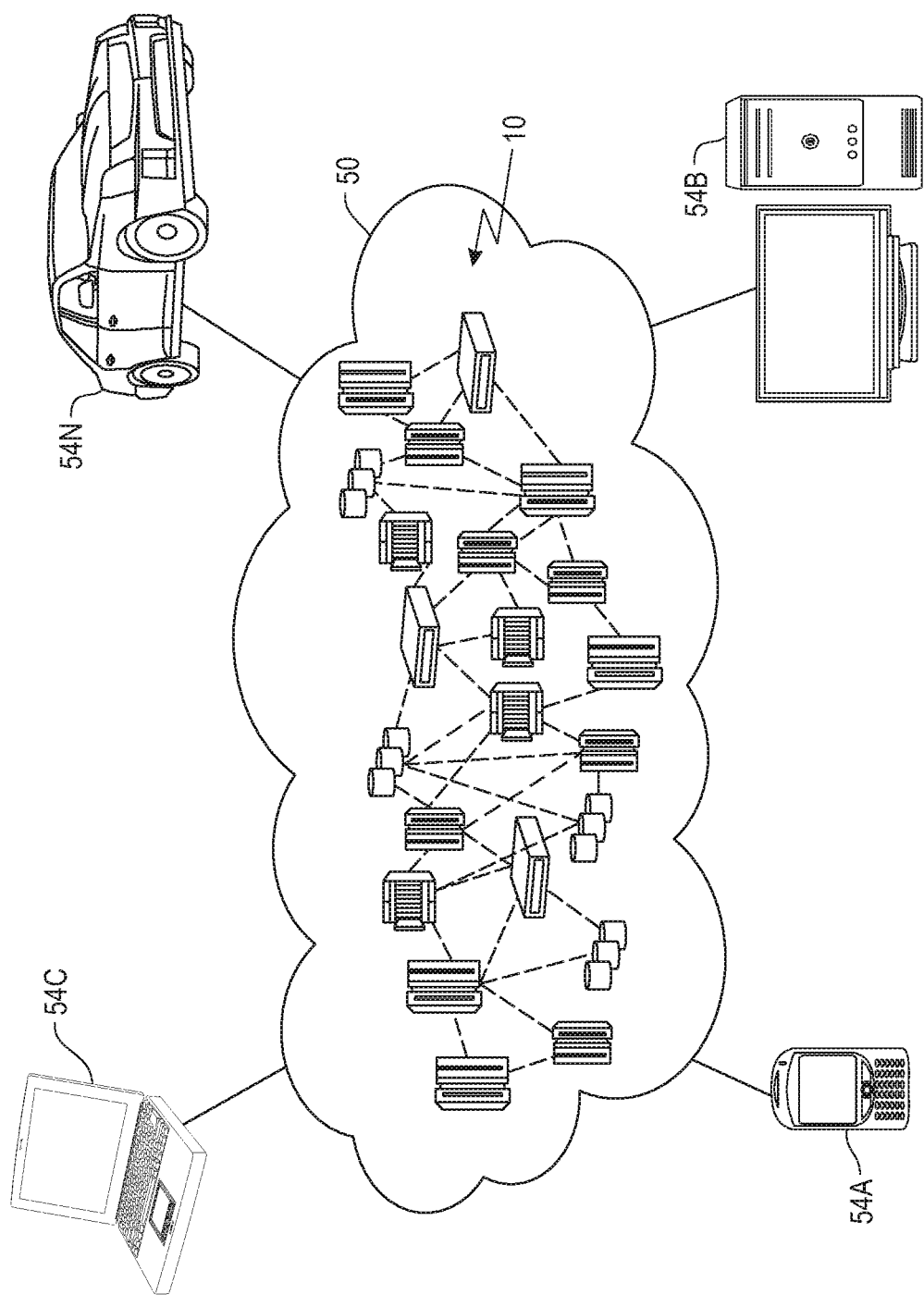
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
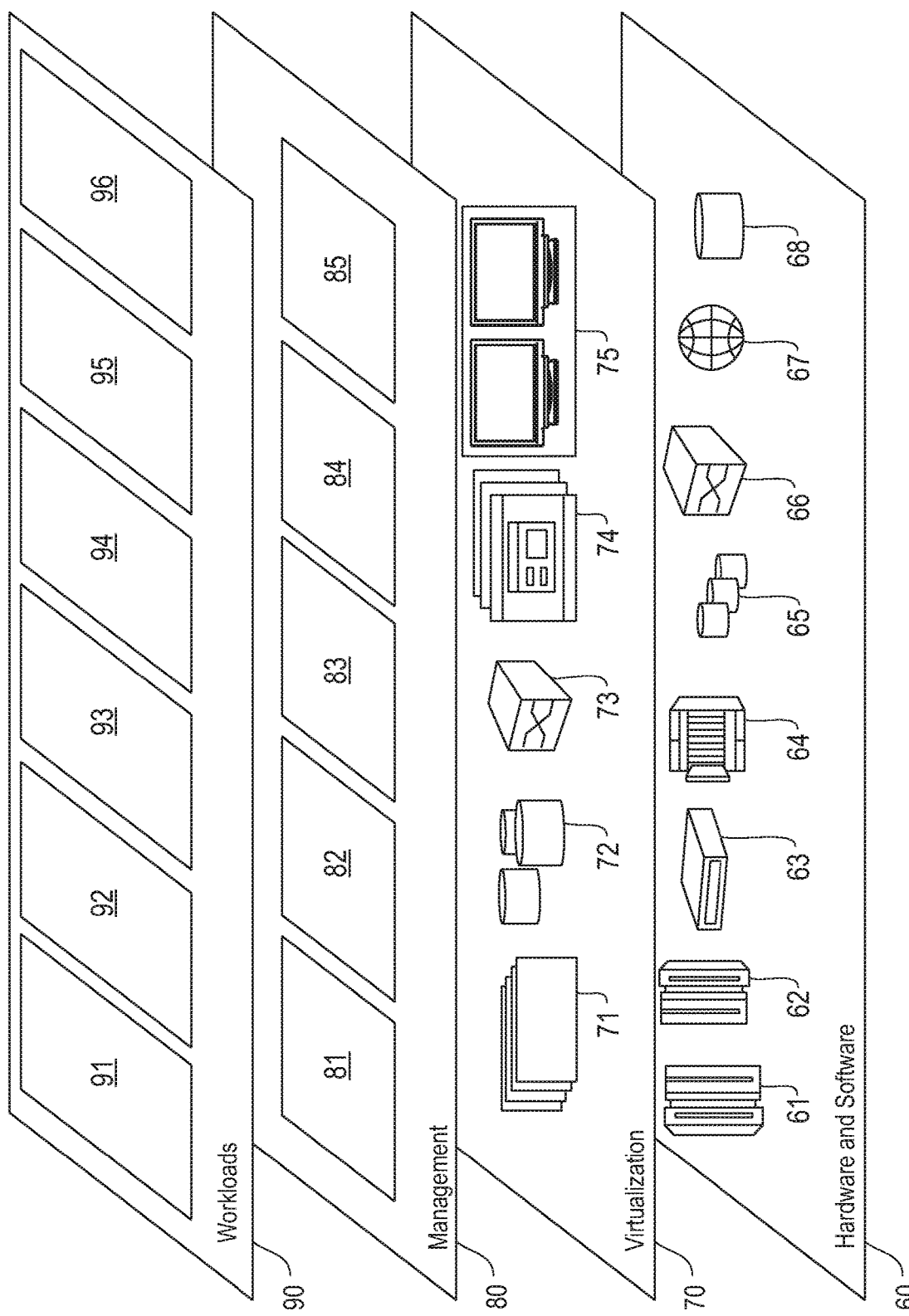
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic diagnostic operation data analysis 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, performing time-based degradation with possible upgradation at different intervals of time based on user time constraints and progress of analysis, utilizing intra-diagnostic dump knowledge to record locality of reference information pertaining to the location of data within dump files and locality of identifiers set in accordance with the intra-diagnostic dump knowledge.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
processing user inputs pertaining to diagnostic operation data analysis associated with a system, wherein the user inputs comprise (i) one or more time constraints and (ii) one or more data classification preferences;
defining, based at least in part on the processed user inputs, one or more aspects of machine learning techniques to be performed in connection with the diagnostic operation data analysis, wherein said defining the one or more aspects of the machine learning techniques comprises:
defining dynamic analysis granularity selection functionality based at least in part on (i) the one or more time constraints and (ii) the level of progress of the diagnostic operation data analysis;
defining dynamic data classification identifier type selection functionality based at least in part on (i) the one or more time constraints and (ii) the level of progress of the diagnostic operation data analysis; and
defining dynamic ordering of data classification identifiers during runtime based at least in part on (i) the one or more data classification preferences, (ii) information pertaining to system workload, and (iii) information pertaining to one or more requested analysis compliance parameters;
dynamically performing the diagnostic operation data analysis by applying the machine learning techniques to the diagnostic operation data;
outputting at least a portion of results of the diagnostic operation data analysis to at least one user; and
automatically tuning at least a portion of the machine learning techniques based at least in part on the results of the diagnostic operation data analysis;
wherein the method is carried out by at least one computing device.

2. The computer-implemented method of claim 1, wherein analysis granularity selection functionality comprises selecting between (i) verbose analysis granularity, (ii) concise analysis granularity, and (iii) Boolean analysis granularity.

3. The computer-implemented method of claim 1, wherein dynamic data classification identifier type selection functionality comprises selecting between (i) one or more precise data classification identifiers and (ii) one or more approximate data classification identifiers.

4. The computer-implemented method of claim 1, comprising:
persisting (i) diagnostic operation data processing information and (ii) related application metadata; and
optimizing one or more subsequent diagnostic operation data analyses based at least in part on (i) the diagnostic operation data processing information and (ii) the related application metadata.

5. The computer-implemented method of claim 1, comprises:
utilizing intra-diagnostic operation data knowledge to record locality of reference information pertaining to one or more locations of particular data within the diagnostic operation data.

6. The computer-implemented method of claim 1, comprises:
utilizing intra-diagnostic operation data knowledge to record locality of one or more identifiers.

7. The computer-implemented method of claim 1, wherein the system comprises a distributed system.

8. The computer-implemented method of claim 7, comprises:
self-tuning a level of sensitivity for the diagnostic operation data generated in the distributed system.

9. The computer-implemented method of claim 8, wherein self-tuning comprising applying the class-to-sensitivity mapping technique comprises implementing (i) one or more direct sensitivity identifiers and (ii) one or more quasi sensitivity identifiers.

10. The computer-implemented method of claim 9, wherein the one or more quasi sensitivity identifiers (i) require two or more particular classes being present together and (ii) consider nearness of data.

11. The computer-implemented method of claim 9, wherein said defining the one or more aspects of the machine learning techniques comprises defining dynamic analysis mode switching functionality based at least in part on a lack of identification of one or more particular data classification identifiers in the diagnostic operation data analysis.

12. The computer-implemented method of claim 11, wherein analysis mode switching functionality comprises selecting between (i) an active mode of analysis and (ii) a passive mode of analysis, wherein the active mode of analysis facilitates identification of one or more quasi-identifiers in the diagnostic operation data analysis.

13. A computer program product comprising a computer readable storage medium having program instructions embodied therewith, the program instructions executable by a computing device to cause the computing device to:
process user inputs pertaining to diagnostic operation data analysis associated with a system, wherein the user inputs comprise (i) one or more time constraints and (ii) one or more data classification preferences;
define, based at least in part on the processed user inputs, one or more aspects of machine learning techniques to be performed in connection with the diagnostic operation data analysis, wherein said defining the one or more aspects of the machine learning techniques comprises:
defining dynamic analysis granularity selection functionality based at least in part on (i) the one or more time constraints and (ii) the level of progress of the diagnostic operation data analysis;
defining dynamic data classification identifier type selection functionality based at least in part on (i) the one or more time constraints and (ii) the level of progress of the diagnostic operation data analysis; and
defining dynamic ordering of data classification identifiers during runtime based at least in part on (i) the one or more data classification preferences, (ii) information pertaining to system workload, and (iii) information pertaining to one or more requested analysis compliance parameters;
dynamically perform the diagnostic operation data analysis by applying the machine learning techniques to the diagnostic operation data;
output at least a portion of results of the diagnostic operation data analysis to at least one user; and
automatically tune at least a portion of the machine learning techniques based at least in part on the results of the diagnostic operation data analysis.

14. The computer program product of claim 13, wherein analysis granularity selection functionality comprises selecting between (i) verbose analysis granularity, (ii) concise analysis granularity, and (iii) Boolean analysis granularity.

15. The computer program product of claim 13, wherein dynamic data classification identifier type selection functionality comprises selecting between (i) one or more precise data classification identifiers and (ii) one or more approximate data classification identifiers.

16. The computer program product of claim 13, wherein the program instructions executable by a computing device further cause the computing device to:
utilize intra-diagnostic operation data knowledge to record locality of reference information pertaining to one or more locations of particular data within the diagnostic operation data; and
utilize intra-diagnostic operation data knowledge to record locality of one or more identifiers.

17. A system comprising:
a memory; and
at least one processor operably coupled to the memory and configured for:
processing user inputs pertaining to diagnostic operation data analysis associated with a system, wherein the user inputs comprise (i) one or more time constraints and (ii) one or more data classification preferences;
defining, based at least in part on the processed user inputs, one or more aspects of machine learning techniques to be performed in connection with the diagnostic operation data analysis, wherein said defining the one or more aspects of the machine learning techniques comprises:
defining dynamic analysis granularity selection functionality based at least in part on (i) the one or more time constraints and (ii) the level of progress of the diagnostic operation data analysis;
defining dynamic data classification identifier type selection functionality based at least in part on (i) the one or more time constraints and (ii) the level of progress of the diagnostic operation data analysis; and
defining dynamic ordering of data classification identifiers during runtime based at least in part on (i) the one or more data classification preferences, (ii) information pertaining to system workload, and (iii) information pertaining to one or more requested analysis compliance parameters;
dynamically performing the diagnostic operation data analysis by applying the machine learning techniques to the diagnostic operation data;
outputting at least a portion of results of the diagnostic operation data analysis to at least one user; and
automatically tuning at least a portion of the machine learning techniques based at least in part on the results of the diagnostic operation data analysis.

18. The system of claim 17, wherein analysis granularity selection functionality comprises selecting between (i) verbose analysis granularity, (ii) concise analysis granularity, and (iii) Boolean analysis granularity.

19. The system of claim 17, wherein dynamic data classification identifier type selection functionality comprises selecting between (i) one or more precise data classification identifiers and (ii) one or more approximate data classification identifiers.

20. The system of claim 17, wherein the at least one processor is further configured for:
utilizing intra-diagnostic operation data knowledge to record locality of reference information pertaining to one or more locations of particular data within the diagnostic operation data; and
utilizing intra-diagnostic operation data knowledge to record locality of one or more identifiers.

* * * * *